(12) United States Patent
Maaref et al.

(10) Patent No.: US 8,908,551 B2
(45) Date of Patent: Dec. 9, 2014

(54) SELF ADAPTIVE MULTI-LEVEL DOWNLINK POWER CONTROL FOR NOISE-LIMITED WIRELESS CELLULAR NETWORKS

(71) Applicants: Amine Maaref, Ottawa (CA); Ying Qian, Kanata (CA); Hadi Baligh, Ottawa (CA); Jianglei Ma, Ottawa (CA)

(72) Inventors: Amine Maaref, Ottawa (CA); Ying Qian, Kanata (CA); Hadi Baligh, Ottawa (CA); Jianglei Ma, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 147 days.

(21) Appl. No.: 13/626,177

(22) Filed: Sep. 25, 2012

(65) Prior Publication Data

US 2014/0086072 A1  Mar. 27, 2014

(51) Int. Cl.
*H04L 1/00* (2006.01)
(52) U.S. Cl.
USPC ....................................................... 370/252
(58) Field of Classification Search
CPC ..... H04W 24/00; H04W 28/08; H04W 72/04; H04W 88/08; H04W 76/00; H04W 52/143; H04L 43/50; H04L 43/0852
USPC .......... 370/252, 329, 328, 311, 338; 455/453, 455/450, 422, 69, 67.11
See application file for complete search history.

(56) References Cited

U.S. PATENT DOCUMENTS

| | | | | |
|---|---|---|---|---|
| 7,613,159 B2 * | 11/2009 | Zeira et al. | ..................... | 370/342 |
| 2010/0136998 A1 * | 6/2010 | Lott et al. | ..................... | 455/453 |

FOREIGN PATENT DOCUMENTS

| | | |
|---|---|---|
| CN | 101127540 | 2/2008 |
| CN | 101527958 | 9/2009 |
| CN | 102421179 | 4/2012 |
| CN | 102469564 | 5/2012 |
| CN | 102573028 | 7/2012 |
| WO | 2012003759 | 2/2012 |

* cited by examiner

*Primary Examiner* — Chi H Pham
*Assistant Examiner* — Alexander O Boakye

(57) ABSTRACT

The invention provides a self-adaptive downlink power control scheme for OFDMA-based wireless cellular networks suitable for noise-limited environments. Downlink power levels are assigned in a distributed manner in the absence of any requirement for coordination or cooperation between cells. Distributed assignment allows for more optimal usage of the available transmit power at the base stations and more complete exploitation of the flexibility of frequency domain scheduling. In one embodiment, base stations in a cellular network service mobile user equipment within the respective base station coverage areas, and categorize the user equipment in a plurality of power levels according to certain criteria in accordance with such factors as channel experience and quality. A load-balancing self-adjustment mechanism allows automatic balancing of the load between different power levels.

27 Claims, 6 Drawing Sheets

Exemplary Computer System 100

Exemplary Computer System 100

Figure 1

Exemplary Computer System 200

SELF ADAPTIVE MULTI-LEVEL DOWNLINK POWER CONTROL FOR NOISE-LIMITED WIRELESS CELLULAR NETWORKS

TECHNICAL FIELD

The claimed subject matter pertains to the configuration and control of power schemes for downlink transmission in wireless cellular networks. In particular, the claimed subject matter provides mechanisms for a self-adaptive downlink power control scheme for Orthogonal Frequency Division Multiple Access (OFDMA) based wireless cellular networks suitable for noise-limited environments.

BACKGROUND

Wireless data communication is a critical component of mobile computing and has become increasingly developed due to the continued progress of mobile computing technologies, the popularity of mobile computing products, and the deployment of numerous, comprehensive infrastructure buildouts providing wireless communication services to the mobile computing products. A typical wireless communication system may be implemented as a multiple access system—capable of supporting communication with multiple users by sharing available system resources (e.g., bandwidth, transmit power, etc.). Examples of such multiple access systems may include code division multiple access (CDMA) systems, high speed packet access (HSPA), wideband code division multiple access (W-CDMA) systems, time division multiple access (TDMA) systems, frequency division multiple access (FDMA) systems, orthogonal frequency division multiple access (OFDMA) systems, among others. Additionally, the systems can conform to specifications such as those promulgated by the Third Generation Partnership Project (3GPP), such as 3GPP Rel. 8 and 9 pertaining to "Long Term Evolution" (LTE), 3GPP Rel. 10 and 11 pertaining to LTE-Advanced, as well as specifications such as ultra mobile broadband (UMB) and WiMAX promulgated by other entities.

Generally, wireless multiple access communication systems may support simultaneous communication for multiple mobile devices in a network. Each mobile device (also referred to as "user equipment" or "UE") may communicate with an operator network (e.g., a cellular network or other mobile devices by connecting to one or more access points (e.g., base stations, relay nodes, etc) of the network, typically via radio frequency (RF) transmissions. The various available technologies that comprise the spectrum of wireless data communications often differ in local availability, coverage range, and performance. Cellular networks are one type of wireless data network, where wireless service is provided over a geographical area, and this service area is divided into a number of smaller (sometimes overlapping) regions known as cells. Each cell is served by at least one generally fixed-location transceiver known as a cell site, node, base station, or base transceiver station (BTS). Individual nodes are also commonly referred to as node base stations ("node Bs"), or eNB ("enhanced node base stations"). When joined together, the network provided by these cells, stations, and/or nodes can cover a significantly wide area. This enables a large number of user-operated mobile computing devices (e.g., mobile phones, tablets, laptops, etc.) to communicate with other nodes in the network via the base stations.

In an OFDMA communication system, each frequency channel, or bandwidth, is split into multiple contiguous Resource Blocks (RBs). Furthermore, multiple RBs may be grouped together to form a Resource Block Group (RBG). A base station then assigns the RBs to user equipment devices (UEs). Data is allocated to the UEs in terms of resource blocks. For any given Transmission Time Interval (TTI), the RBs are allocated to UEs based on measured channel conditions. The channel condition measurements are performed by a user equipment (UE), which measures channel conditions for one or more RBGs during a measuring period. The UE can report the measured channel conditions for the RBG to the servicing base station. In accordance with the reported Channel Quality Information (CQI) message, an OFDMA communication system is able to selectively schedule the RBs over a scheduling period, typically lasting one or more TTIs or radio frames. The scheduling decision—which is typically performed in the base station—can be modified every transmission time interval (TTI), and takes into account the radio link quality situation of different users, the overall interference situation, Quality of Service requirements, service priorities and other considerations.

Standards such as LTE specify that UEs can only assume a certain number of quantized power levels, also known as $P_A$ (Power Assignment) values. These $P_A$ values are communicated periodically (e.g. minutes level) to UEs through Radio Resource Control (RRC) signaling and typically cannot be changed on the fly. As a result, power control schemes for base stations generally assign multiple $P_A$ values to the UEs in the downlink (transmission). Unfortunately, assignment of these $P_A$ values impacts the load balancing between different power levels in a cell and has to be done properly in order to ensure a suitable tradeoff between throughput and coverage within each cell.

Conventional inter-cell interference coordination (ICIC) schemes such as the Soft Frequency Reuse (SFR) technique, rely on RB power mask coordination between different cells in order to reduce the level of interference due to neighboring cells in the network. This is often achieved by boosting (via a pre-defined power mask) the power used to transmit data for a fixed and pre-determined set of RBs, while the power assigned to other RBs is reduced in order to abide by the total power constraint. To reduce redundancy, and further reduce interference, each cell will coordinate and cooperate with neighboring cells such that power-boosted RBs are not assigned to the same vicinities. While this solution can be effective in a network dominated by inter-cell interference, having a pre-determined power mask can also limit performance (e.g., average cell throughput) under Frequency Selective Scheduling (FSS) systems because cell edge UEs (power boosted UEs) are constrained to use the pre-set power boosted RBs and can no longer enjoy the flexibility to be scheduled over the whole bandwidth.

Moreover, while these solutions are suitable for interference-dominated scenarios, in noise (rather than interference) dominated scenarios, reducing inter-cell interference is not an effective solution, since the performance of the network is not significantly impacted by interference. Therefore the use of conventional techniques directed to solving interference problems in a noise-dominated scenario will only incur the loss of average cell throughput without realizing any of the solution's purported advantages.

SUMMARY

To address the type of problems noted above and other considerations, this disclosure provides novel methods and systems providing increased cellular network performance in noise-dominated environments by assigning downlink power levels in a distributed manner, in the absence of a requirement for coordination or cooperation between cells, while making full usage of available transmit power at base stations and exploiting the flexibility of frequency domain scheduling.

In an embodiment, a cellular network is provided wherein every base station serves a group of mobile user equipment devices (UEs) within its coverage area (or cell) and categorizes the UEs according to certain criteria in accordance with channel experience and quality. The embodiment self-adaptively assigns downlink power levels with multi-level transmit power densities and multi-level power boosting for UEs with poor channel experience and quality, while lowering the power level for UEs with higher performing channels. According to further embodiments, a load balancing self-adjustment mechanism allows a base station to automatically balance traffic loads between different power levels to achieve an optimal balance of throughput and coverage.

In an embodiment, a method is provided that self-adaptively selects, on a cell-by-cell basis, a number of Power Assignment values among a set of Power Assignment values in the downlink channel and automatically assigns the Power Assignment values to UEs of a cell. The Power Assignment values correspond to the power used by the base station of the cell to transmit data to the UE. Given the selected number of Power Assignment values for each cell, the proposed method first categorizes the UEs into a number of categories corresponding to the number of Power Assignment values according to respective geometries (e.g., channel performances) of the UEs with respect to the base station of the cell, and certain load balancing considerations.

The method proceeds to assign Power Assignment values to UEs in decreasing order of their geometry/channel performance distribution, such that the highest Power Assignment value is assigned to the UEs experiencing the poorest cellular performance (e.g., "poor geometry") in a cell, with the next highest Power Assignment value being assigned to the UEs in the class experiencing the next poorest cellular performance, and so on until all UEs have been assigned a Power Assignment value, and so that the UEs experiencing poor cellular performance will receive data transmitted at a higher power rate. This may be performed according to a very simple procedure providing for matching UE category with the corresponding PA level. According to further embodiments, load balancing in favor of UEs assigned to low Power Assignment values can also be performed. Depending on the actual Power Assignment values, this can be achieved by ensuring that the percentage of power boosted UEs exceeds the percentage of UEs assigned to low Power Assignment values.

BRIEF DESCRIPTION OF DRAWINGS

The accompanying drawings, which are incorporated in and form a part of this specification, illustrate embodiments of the disclosure and, together with the description, serve to explain the principles of the presently claimed subject matter:

DETAILED DESCRIPTION

Reference will now be made in detail to several embodiments. While the subject matter will be described in conjunction with the alternative embodiments, it will be understood that the described embodiments are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Portions of the detailed description that follow are presented and discussed in terms of a process. Although operations and sequencing thereof are disclosed in a figure herein (e.g., FIGS. 3, 4, and 5) describing the operations of this process, such operations and sequencing are exemplary. Embodiments are well suited to performing various other operations or variations of the operations recited in the flowchart of the figure herein, and in a sequence other than that depicted and described herein.

As used in this application the terms component, module, system, and the like are intended to refer to a computer-related entity, specifically, either hardware, firmware, a combination of hardware and software, software, or software in execution. For example, a component can be, but is not limited to being, a process running on a processor, an integrated circuit, an object, an executable, a thread of execution, a program, and or a computer. By way of illustration, both an application running on a computing device and the computing device can be a component. One or more components can reside within a process and/or thread of execution, and a component can be localized on one computer and/or distributed between two or more computers. In addition, these components can be executed from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile computing device and/or a base transceiver station. A mobile computing device can refer to a device providing voice and/or data connectivity to a user. A mobile computing device can be—or can be connected to—a computing device, such as a laptop computer or desktop computer, or it can be a self contained device such as a smartphone or personal digital assistant (PDA). A mobile computing device can also be called a user device or user equipment (UE). A base transceiver station (BTS) may also be referred to as an access point, node B, enhanced Node B (eNB), and can refer to a device in an access network that communicates over the air interface through one or more sectors with mobile computing devices. The base transceiver station can act as a router between a mobile computing device and the rest of the operator network which can include an Internet Protocol (IP) network by converting received air interface signals to IP packets.

Various techniques described herein can be used for wireless communication systems, such as Orthogonal Frequency Division Multiple Access (OFDMA) systems. The terms "system" and "network" may be used herein interchangeably. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, etc. E-UTRA is part of Universal Mobile Telecommunication System (UMTS). 3GPP Long Term Evolution (LTE) uses E-UTRA which employs OFDMA on the downlink and SC-FDMA on the uplink.

Exemplary Base Station

Figure 1:
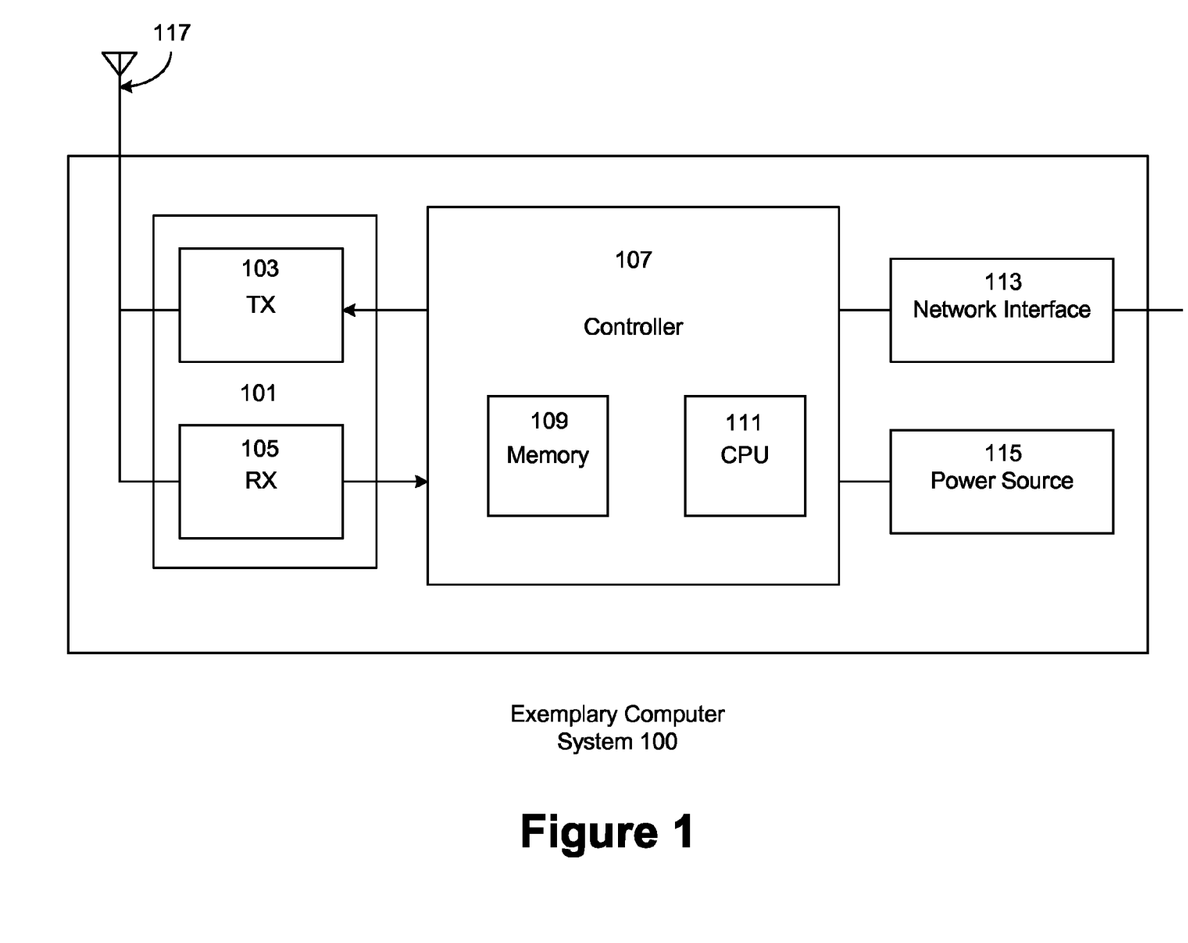
FIG. 1 depicts an exemplary wireless communication apparatus upon which embodiments of the present invention may be implemented.

As presented in FIG. 1, an exemplary wireless communication apparatus 100 upon which embodiments of the present invention may be implemented is depicted. In an embodiment, wireless communication apparatus 100 may be implemented as a base station, also known as a base transceiver station, small-cell base station, Node B, or enhanced Node B (eNB), which provides access to a wireless network in a vicinity, comprising a cell, around the apparatus 100 to the one or more mobile computing devices (not shown), or users' equipment (UEs) located within the cell of the apparatus 100. Wireless communication apparatus 100 may facilitate wireless data transmission with the one or more UEs via a transceiver 101 in the base station. As depicted, the transceiver 101 can comprise both a transmitter 103 for transmitting downlink data to the one or more UEs, that is, from the base station to the UE, and a receiver for receiving uplink data, i.e., from the UE to the base station. Each of downlink and uplink can comprise multiple physical communication channels, including multiple control channels and multiple traffic channels.

According to some embodiments, the transceiver 101 of the base station may also be coupled to an antenna array 117 comprising multiple antennae or antenna components. Data transmission and processing is managed in a controller 107 of the apparatus 100. As depicted, the controller can comprise, and/or be coupled to, at least one processor 111 (e.g., one or more microprocessors, central processing units, etc.). The operations and functions performed by the processor 111 are determined by executing, in the processor 111, programmed software instructions and routines stored in one or more memory devices 109. Memory devices may be implemented in a variety of ways, depending on particular embodiments, and may be volatile (such as RAM), non-volatile (such as ROM, flash memory, etc.), some combination of volatile and non-volatile memory, or other suitable device capable of storing for subsequent recall data and/or instructions executable on the processor 111.

As depicted in FIG. 1, apparatus 100 may also include a network interface 113, coupled to the network interfaces of other, neighboring cells and similar apparatuses, and/or directly to one or more cellular network operators. Apparatus 100 also includes a power source 115, configured to provide power required to operate the apparatus 100. In an embodiment, the power source 115 may be limited, or restricted from exceeding a predetermined parameter. For example, power used to transmit data to a UE may be capped at a pre-determined and/or adjustable power level for a given period of time. The processes 300, 400, and 500 (described below) may be performed, in whole or in part, by apparatus 100 via the processor 111 in conjunction with the memory 109.

Exemplary User Equipment

Figure 2:
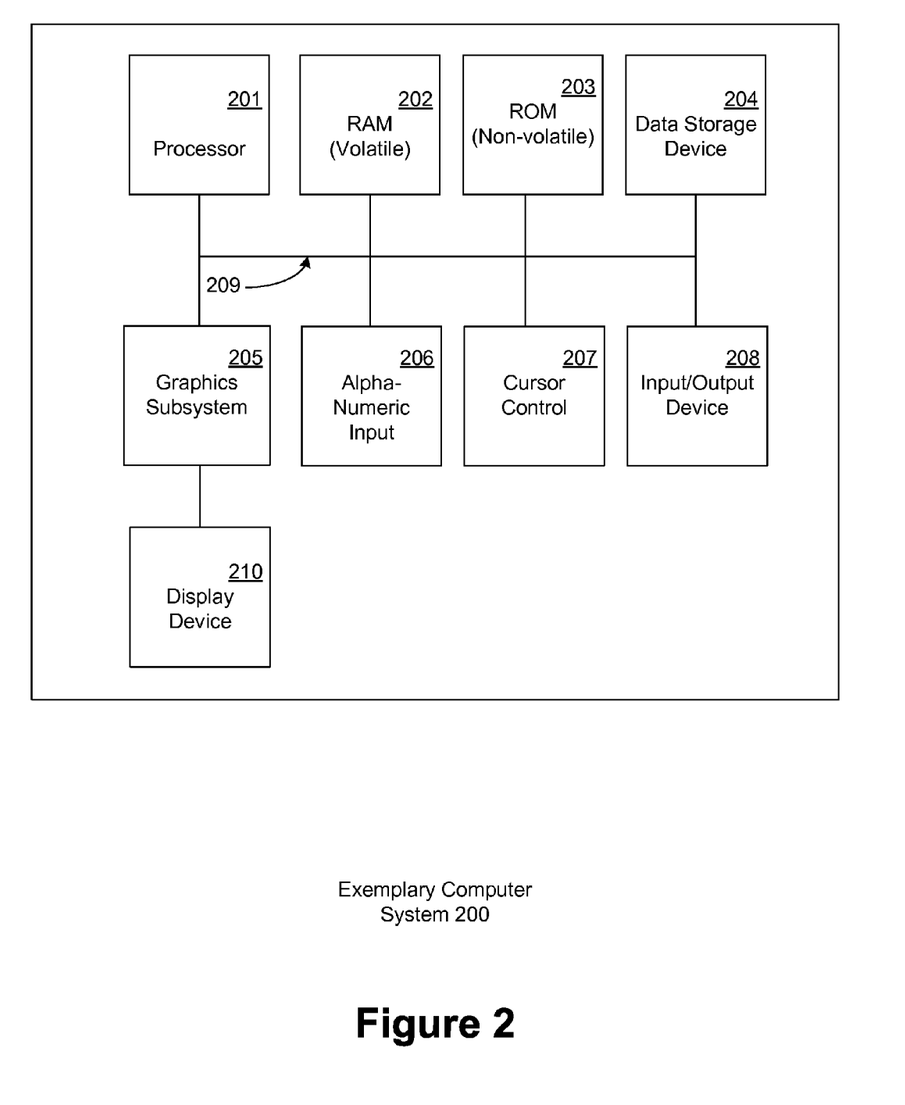
FIG. 2 depicts an exemplary user equipment, in accordance with embodiments of the present disclosure.

As presented in FIG. 2, an exemplary user equipment is implemented, such as mobile computing device 200. Mobile computing device 200 may be implemented as, for example, a cellular telephone, a smart phone, a radio telephone, a personal digital assistant (PDA) with radio frequency (RF) capabilities, or a wireless network interface that provides RF access, such as those found in laptop or tablet computers. Such wireless capabilities can be incorporated into the device as an embedded module connected (directly or indirectly) to the processor, or via a removable component (such as a dongle, PCMCIA card, USB modem and the like) operatively connected to the processor. In its most basic configuration, mobile computing device 200 typically includes at least one processing unit 201 and memory, and an address/data bus 209 (or other interface) for communicating information. Depending on the exact configuration and type of mobile computing device environment, memory may be volatile (such as RAM 202), non-volatile (such as ROM 203, flash memory, etc.) or some combination of volatile and non-volatile memory, or other suitable device capable of storing for subsequent recall data and/or instructions executable on the processing unit 201.

In some embodiments, mobile computing device 200 may also comprise an optional graphics subsystem 205 for presenting information to the computer user, e.g., by displaying information on an attached or integrated display device 210. Additionally, computing system 200 may also have additional features/functionality. For example, computing system 200 may also include additional storage (removable and/or non-removable) including, but not limited to, magnetic or optical disks or tape. Such additional storage is illustrated in FIG. 2 by data storage device 204. Computer storage media includes volatile and nonvolatile, removable and non-removable media implemented in any method or technology for storage of information such as computer readable instructions, data structures, program modules or other data. RAM 202, ROM 203, and data storage device 204 are all examples of computer storage media.

Mobile computing device 200 may also comprise a physical (or virtual) alphanumeric input device 206, an physical (or virtual) cursor control or directing device 207. Optional alphanumeric input device 206 can communicate information and command selections to central processor 201. Optional cursor control or directing device 207 is coupled to bus 209 for communicating user input information and command selections to central processor 201. As shown in FIG. 2, Mobile computing device 200 also includes one or more signal communication interfaces (input/output devices, e.g., a network interface card) 208. The signal communication interface may function as a transceiver for the mobile computing device 200, and allow the transmission and reception of wireless data from one or more base stations.

Multilevel Downlink Control Scheme

Figure 3:
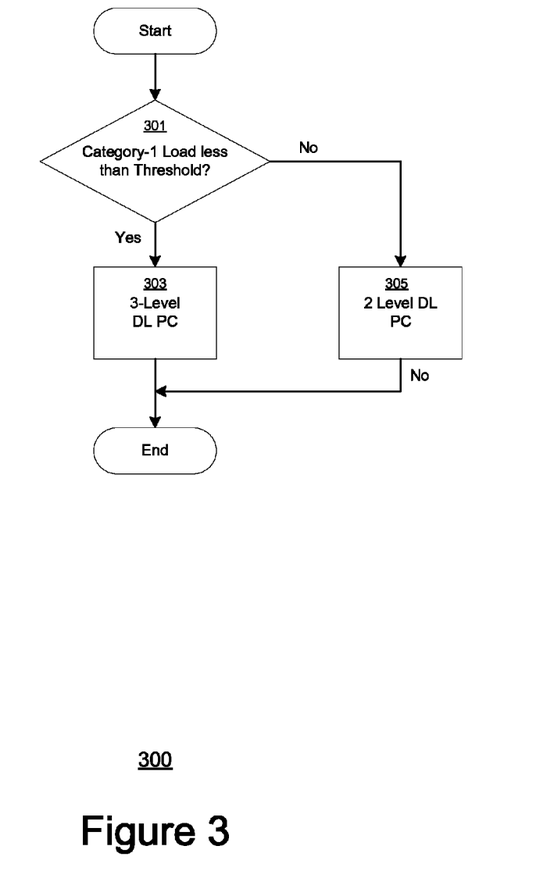
FIG. 3 depicts a flowchart of a process for a self-adaptive multi-level downlink power control with no more than three power levels, in accordance with embodiments of the present disclosure.

FIG. 3 depicts a flowchart 300 of a process for a self-adaptive multi-level downlink power control with no more than three power levels, in accordance with embodiments of the present disclosure. Steps 301 to 305 describe exemplary steps comprising the process 300 depicted in FIG. 3 in accordance with the various embodiments herein described. In one embodiment, the process 300 is implemented in whole or in part as computer-executable instructions stored in a computer-readable medium and executed by a processor in a base transceiver station.

At step 301, an aggregate traffic load for a unit of time (e.g., a Transmission Time Interval) of UEs deemed to have low cellular performance according to a predefined metric is aggregated, and the aggregate sum of the traffic loads is then compared with a predetermined threshold at step 301. According to various embodiments, a UE may be determined to have low cellular performance (e.g., "poor geometry") in a cell corresponding to a base station due to the particular geometry of the UE with respect to the base station. For example, UEs with poor geometries may comprise UEs farther away (e.g., "cell-edge" UEs) from the base station, or those located under signal attenuating circumstances (e.g., indoors, in insulated and/or shielded structures). UEs with advantageous geometries may consist of UEs proximate to (e.g., "cell-center" UEs) the base station and/or capable of exchanging data with relatively un-attenuated signals.

According to various embodiments, a UE's geometry can be estimated by reports corresponding to the Signal Strength (RSRP), Signal Quality (RSRQ) Best CINR, and/or Uplink and Downlink Throughput. The threshold used corresponds to a power budget corresponding to the amount of power required to transmit downlink data from the base station to the UEs for the unit of time. For example, in embodiments wherein the threshold is 30% of the power budget, when the aggregate traffic load and UE geometries require less than 30% of the power budget for a given unit of time, the process 300 proceeds to step 303. When the threshold is exceeded, the process proceeds to step 305.

At step 303, when the aggregate traffic load for a unit of time is determined at step 301 to be below a predefined threshold, a three level downlink power control scheme is implemented by the base station. Subsequently, the UEs within the cell of the base station are classified and distributed among the three levels such that the UEs with the poorest relative geometry (cell-edge UEs) are assigned to the third and highest level, the UEs with the most advantageous relative geometry (cell-center UEs) are assigned to the first and lowest level, and the UEs with neither advantageous nor disadvantageous geometries are assigned to the second and middle level. According to further embodiments, UEs with geometries below a pre-defined threshold may be automatically assigned to the highest (e.g., third) power level.

The power used to transmit data (e.g., packets) to the UEs in each power level varies, depending on the particular level. For example, power used to transmit data to the third and poorest relative geometry UEs may be boosted to increase performance. Power used to transmit data to the second power level may also be boosted, maintained, or even reduced, according to the power budget and the total power required for the UEs in the third power level. Since a portion of the power used to transmit data to the UEs in the first level may be wasted during each transmission (i.e., power used may exceed what is necessary to transmit data with good performance), a portion of the power used to transmit data to the UEs in the first level may be reallocated (e.g., added to the power used to transmit data to the UEs in the third level) such that the power required during any unit of time does not exceed a maximum power budget, and that power used is no longer wasted and/or gratuitous. The three power level arrangement can last until the next time the process is repeated. Whenever a cell under a three power level configuration has no UEs with poor performance or poor geometries, the power scheme may automatically default back to a two level arrangement (described below).

At step 305, when the aggregate traffic load for a unit of time is determined at step 301 to be at or exceed a predefined threshold, a two level downlink power control scheme is implemented by the base station. Under such an arrangement, a portion of the UEs with the least advantageous relative geometries are assigned the highest level, whereas the remaining UEs are assigned to the lower power level. Subsequently, power expended to transmit data from the base station's transceiver to the UEs in the lower power level may be boosted to increase performance, while the power expended to transmit data from the base station's transceiver to the UE's in the higher power level may be reduced. According to various embodiments, the process 300 may be repeated periodically, every few minutes, for example. By repeating the process frequently, the constant re-arrangement of UEs and power levels achieves load balancing between power levels, thereby balancing increased coverage, while maintaining throughput.

Figure 4:
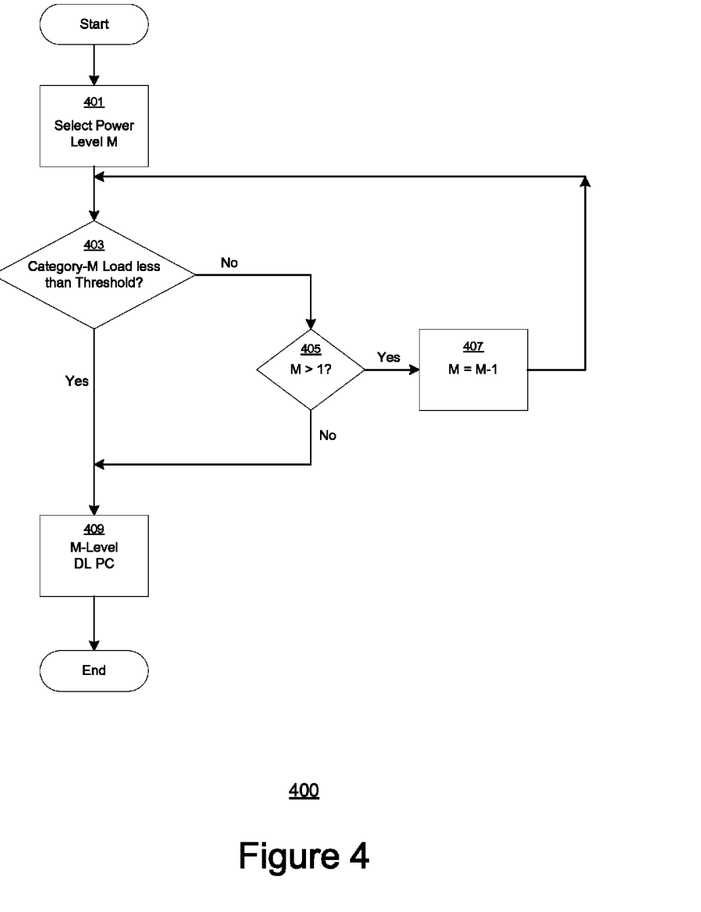
FIG. 4 depicts a flowchart of a process for a self-adaptive multi-level downlink power control with an M number of power levels, in accordance with embodiments of the present disclosure.

FIG. 4 depicts a flowchart 400 of a process for a self-adaptive multi-level downlink power control with an M number of power levels, in accordance with embodiments of the present disclosure. Steps 401 to 409 describe exemplary steps comprising the process 400 depicted in FIG. 4 in accordance with the various embodiments herein described. In one embodiment, the process 400 is implemented in whole or in part as computer-executable instructions stored in a computer-readable medium and executed by a processor in a base transceiver station.

At step 401, a power level from a plurality of power levels is selected by the base station, and the number of UEs presently corresponding to the power level is determined. The power required to transmit data in the amount of the aggregate traffic load of the UEs of the power level selected at step 401, and given the respective geometries of the UEs in the power level is then calculated for a unit of time (e.g., a TTI) and compared to a threshold power budget at step 403. According to some embodiments, the threshold is a pre-defined threshold specific to the selected power level. When the aggregate traffic load and UE geometries of the selected power level requires less than the threshold of the power budget for a given unit of time (step 403), the process 400 proceeds to step 409. When the threshold is exceeded, the process instead proceeds to step 405.

At step 405, a determination is made as to whether the selected power level is the lowest power level. If not, the process proceeds to step 407, whereupon the selected power level is automatically decremented to the power level immediately below the selected power level. After which, the UEs are reassigned to the power level immediately below the selected power level, and the process repeats again from step 403. In instances where the selected power level is the lowest power level, as determined in step 405, the UEs remain at the selected (lowest) power level, at step 409. As with the process 300, the process 400 may also be repeated periodically to achieve load balancing between power levels, and/or to adjust the number of power levels, in order to provide increased coverage to UEs with poor relative geometries, while maintaining overall throughput in the system.

According to an embodiment, processes 300 and 400 may be performed in response to a detected change in user equipment conditions in a cell of a network. For example, a change in a distribution of user equipment geometries, or a change in a distribution of load corresponding to user's equipment may cause an adjustment of the transmit power levels used to transmit data to the users' equipment in the cell. In further embodiments, changes in either user equipment geometries, and/or loads above a pre-defined threshold will cause an adjustment of the transmit power levels, if determined to be necessary. Adjusting the transmit power levels may be performed as described above with respect to process 300 or 400, and follow a pre-adjustment process in which the plurality of available transmit power levels are determined (e.g., from a plurality of pre-defined power levels), and a bandwidth corresponding to each of the available transmit power levels is calculated.

Multilevel Downlink Control Scheme Scheduling

Figure 5:
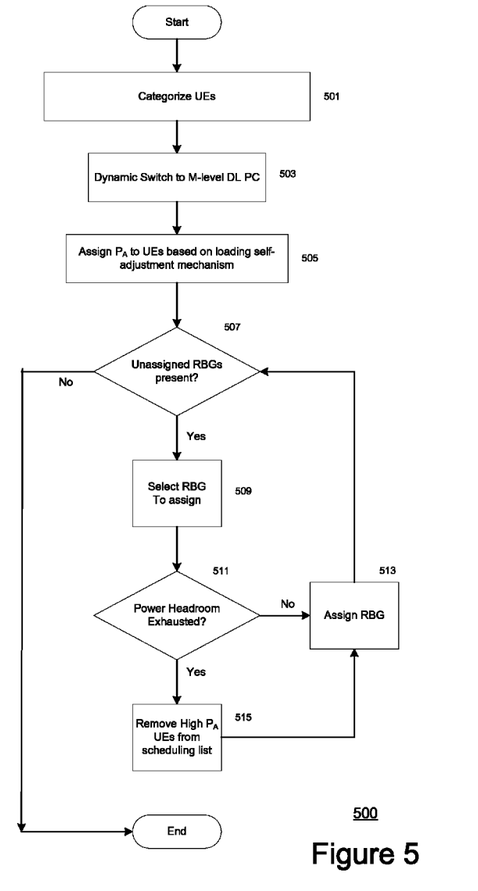
FIG. 5 depicts a flowchart 500 of a process for scheduling transmissions in a multi-level downlink power control scheme, in accordance with embodiments of the present disclosure.

FIG. 5 depicts a flowchart 500 of a process for scheduling transmissions in a multi-level downlink power control scheme. Steps 501 to 515 describe exemplary steps comprising the process 500 depicted in FIG. 5 in accordance with the various embodiments herein described. In one embodiment, the process 500 is implemented in whole or in part as computer-executable instructions stored in a computer-readable medium and executed by a processor in a base transceiver station.

At step 501, the user equipment devices within a cell of a base station or eNB are classified for a unit of time (e.g., TTI). Classification can be performed according to a pre-selected metric, such as the geometry of the UE relative to the base station, any Channel Quality Information (CQI) messages transmitted by the UE, or any other channel quality metric. At step 503, the power control scheme executed by the base station is dynamically switched to a multi-level downlink power control scheme. The power control scheme may also switch from a multi-level downlink power control scheme with a different number of levels, for example. At step 505, the UEs are distributed amongst the power levels of the downlink power control scheme, and a Power Assignment ($P_A$) value is assigned to UEs. Distribution of the UEs may be performed based on the respective classification of each UE, such that UEs with the poorest wireless communication performances (due to geometries, for example) are allocated to the highest levels of the power control scheme, whereas the UEs with the best wireless communication performances are allocated to the lowest levels of the power controls scheme. According to an embodiment, the percentage of UEs distributed to lower levels of the power control scheme is never greater than the percentage of UEs distributed to higher levels of the power control scheme At step 507, the presence or absence of unassigned Resource Block Groups (RBGS) is determined. If the presence of unassigned RBGs is determined at step 507, the process 500 proceeds to step 509. Otherwise, the process 500 terminates. At step 509, an unassigned RBG is selected. The process then proceeds to step 511, where a remaining power buffer for the particular unit of time is calculated. If the power buffer is exhausted, the process proceeds to step 515, whereupon only the data transmissions addressed to the UEs with the lowest $P_A$ values are scheduled, and the UEs with the higher $P_A$ values are removed from the scheduling list. If, however, the power budget is not exhausted, the process proceeds to step 513, whereupon the RBG selected at step 509 is allocated to a UE with a high $P_A$ value in order to transmit wireless data from the base station to the UE. Once allocated at step 513, the process 500 repeats from step 503.

In order to maintain a high Resource Block (RB) utilization, a scheduler checks the power buffer for every RBG allocation at every TTI. Once the power buffer is exhausted, only low $P_A$ UEs are scheduled at the remaining RBGs for the TTI. The power buffer refers to the total remaining power allotted if all the RBGs were allocated to low $P_A$ UEs. Once the $P_A$ assignment and load balancing algorithm has been performed, the final PA assignments are communicated to the scheduler module that will perform the RB scheduling task while abiding by the total power constraint. By load balancing between high and low power levels, all of the UEs of a cell will experience comparable performance metrics while the power buffer is efficiently utilized for each TTI.

Figure 6:
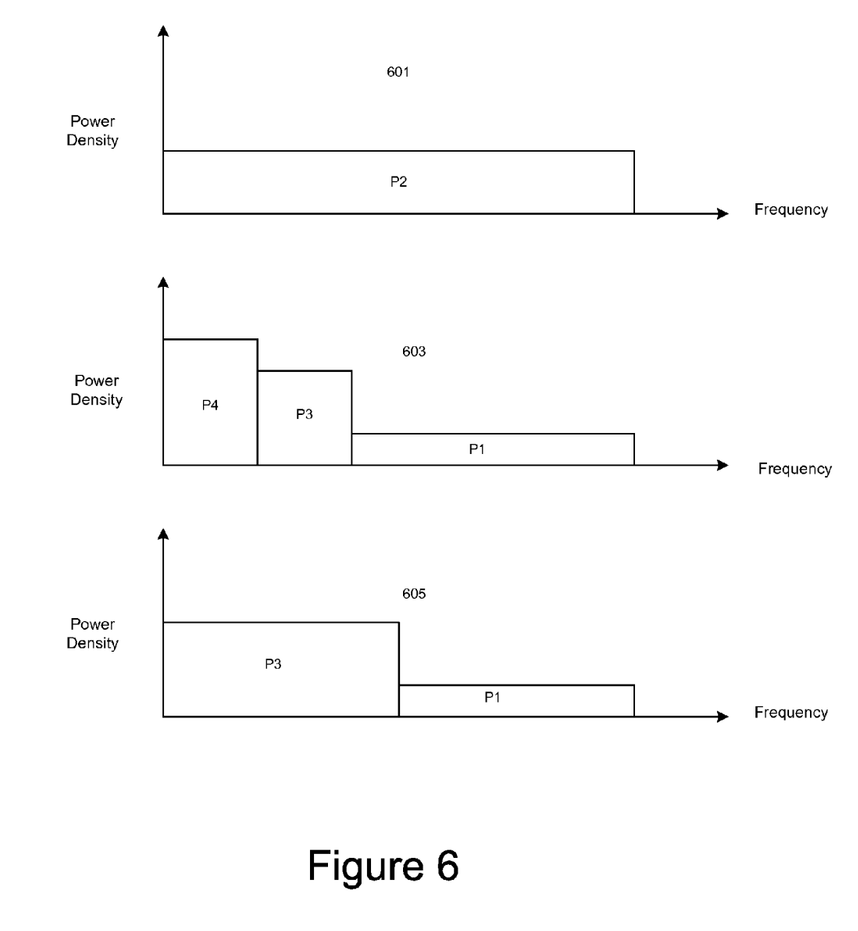
FIG. 6 depicts graphs of power assignment values used by single, double, and triple power level control schemes, in accordance with embodiments of the present disclosure.

FIG. 6 depicts graphs of power assignment values used by single 601, double 605, and triple 603 power level control schemes, in accordance with embodiments of the claimed subject matter. As depicted in FIG. 6, a downlink control scheme with a single power assignment value (P2) can, naturally, use only a single power assignment for all of the UEs in a cell of a base station, regardless of the UE's position, or relative geometry. Thus, the amount of coverage is weaker for cell-edge UEs, while power may be wasted in transmitting to cell-center UEs.

A triple level (603) downlink control scheme may select from one of three different power assignment values (P1, P3, P4) to assign to each UE in the cell. Accordingly, coverage can be extended by boosting (e.g., using P4) the power assignment of cell-edge UEs and reducing (e.g., using P1) the power assignment of cell-center UEs. UEs that are neither cell-edge UEs nor cell-center UEs may be maintained at a constant power level, slightly reduced, or slightly boosted (e.g., using P3), depending on the available bandwidths and the traffic loads of the UEs in the other power levels Likewise, a double level (605) downlink control scheme may assign one of two power assignments values (P1, P3) for each UE in the cell, using a boosted (P3) power assignment value for UEs experiencing poor service, and using a reduced (P1) power assignment for UEs positioned such that greater power assignment is not necessary.

As described above, embodiments of the presently claimed subject matter are directed to a self-adaptive multi-level downlink power control scheme which provides advantages over conventional techniques for downlink power control and scheduling over a wireless cellular interface. These advantages include providing a flexible, UE-centric power control scheme without requiring additional coordination or cooperation between cells, and the efficient utilization of a power budget for given units of time. Additional advantages include extending power-boosting to UEs distributed among multiple levels and for an adjustable number of RBs, to provide greater coverage in the cell—particularly in noise-dominated scenarios—while still maintaining a constant level of throughput in the system. Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for self-adaptive multi-level downlink power control in wireless cellular networks, the method comprising:
    detecting, in a network, a change in a user equipment condition corresponding to a user equipment of a plurality of user equipment;
    in response to detecting the change in the user equipment condition:
        determining a plurality of transmit power levels from a plurality of pre-defined power levels;
        calculating a bandwidth corresponding to each transmit power level of the plurality of transmit power levels; and
    adjusting the plurality of transmit power levels in accordance with the bandwidth corresponding to each transmit power level of the plurality of transmit power levels when a traffic load from the base station to the plurality of user equipment at a selected transmit power level of the plurality of transmit power levels exceeds a threshold traffic level.

2. The method according to claim 1, wherein a change in the user equipment condition comprises at least one of: a change in a distribution of user equipment geometry and a change in a distribution of load corresponding to user equipment.

3. The method according to claim 1, wherein adjusting the plurality of transmit power levels comprises:

selecting the selected transmit power level from the plurality of transmit power levels, the selected transmit power level corresponding to a transmit power level being used to transmit data from a base station to the plurality of user equipment;

determining the traffic load from the base station to the plurality of user equipment at the selected transmit power level;

comparing the traffic load with a first threshold traffic load corresponding to the selected transmit power level; and adjusting the selected transmit power level during a period of time when the selected transmit power level is not a lowest transmit power level of the plurality of transmit power levels.

4. The method according to claim 3, wherein the method is repeated periodically.

5. The method according to claim 3, wherein adjusting the selected transmit power level comprises automatically decreasing the transmit power level from the selected transmit power level to the highest transmit power level below the selected transmit power level of the plurality of transmit power levels.

6. The method according to claim 3, wherein selecting a transmit power level from the plurality of transmit power levels comprises determining a number of user equipment corresponding to the selected transmit power level.

7. The method according to claim 6, wherein the selected transmit power level is automatically decremented to the highest transmit power level below the selected transmit power level of the plurality of transmit power levels if no user equipment corresponds to the selected transmit power level.

8. The method according to claim 3, wherein the number of transmit power levels comprising the plurality of transmit power levels is adjustable.

9. The method according to claim 8, wherein the base station provides wireless cellular service to an area surrounding the base station, the area comprising a cell, and wherein the plurality of user equipment occupies a corresponding plurality of positions within the cell.

10. The method according to claim 9, wherein the number of transmit power levels comprising the plurality of transmit power levels is automatically adjusted to correspond to at least one of:
    a distribution of the positions of the plurality of user equipment relative to the base station; and
    a distribution of the traffic load among the plurality of transmit power levels corresponding to the plurality of user equipment.

11. The method according to claim 3, wherein the base station has a maximum amount of available transmission power for a Transmission Time Interval.

12. The method according to claim 11, wherein each of the plurality of transmit power levels has a transmission load, the transmission load comprising an amount of power required to transmit data from the base station to the user equipment corresponding to the transmit power level for a Transmission Time Interval.

13. The method according to claim 12, wherein a total transmission load comprising transmission loads corresponding to all of the plurality of transmit power levels does not exceed the maximum amount of available transmission power for a Transmission Time Interval.

14. The method according to claim 3, wherein a user equipment of the plurality of user equipment is comprised from the group of electronic devices comprising:
    a cellular phone;
    a tablet;
    a laptop;
    a personal data assistant;
    a USB modem.

15. A method to control power usage in a base station, the method comprising:
    classifying a plurality of user equipment connected to the base station into a plurality of categories;
    dynamically adjusting a power control scheme of the base station to comprise a plurality of power levels corresponding to the plurality of categories;
    selecting a target load for each of the plurality of power levels;
    assigning power assignments to the plurality of user equipment;
    calculating a remaining power buffer from a maximum power budget and the power assignments assigned to the plurality of user equipment devices; and
    scheduling a plurality of data transmissions in accordance with the remaining power buffer.

16. The method according to claim 15, wherein calculating a power buffer comprises:
    determining a presence of a plurality of unassigned Resource Block Groups corresponding to the base station; and
    assigning an unassigned Resource Block Group to user equipment of the plurality of user equipment when the remaining power buffer is not exhausted.

17. The method according to claim 15, wherein assigning power assignments to the plurality of user equipment comprising assigning power assignments to the plurality of user equipment according to a geometry distribution corresponding to the plurality of user equipment.

18. The method according to 17, wherein the user equipment with the worst performing geometries are assigned the highest power assignments.

19. The method according to claim 15, further comprising performing load balancing on user equipment with low power assignments.

20. The method according to 19, wherein user equipment with low power assignments comprise a first percentage of the plurality of user equipment, and user equipment with a power assignment greater than the low power assignment comprise a second percentage of the plurality of user equipment.

21. The method according to claim 20, wherein performing load balancing comprises ensuring that the second percentage is greater than the first percentage.

22. The method according to claim 15, wherein scheduling a plurality of tasks in accordance with the remaining power buffer comprises scheduling data transmissions only for the user equipment with the lowest power assignments when the remaining power buffer is exhausted.

23. The method according to claim 22, wherein calculating the remaining power buffer from a maximum power budget and the power assignments assigned to the plurality of user equipment and the scheduling of the plurality of data transmissions in accordance with the remaining power buffer are repeated every Transmission Time Interval.

24. The method according to claim 15, wherein classifying a plurality of user equipment connected to the base station into a plurality of categories comprises classifying each user equipment of the plurality of user equipment in accordance with a channel quality corresponding to the user equipment.

25. The method according to claim 24, wherein the channel quality corresponding to the user equipment arises from at least one of the following factors:

a geometry of the user equipment relative to the base station;

a Channel Quality Information report submitted by the user equipment to the base station;

a type of data traffic corresponding to the data transmitted from the base station to the user equipment;

a ratio of ACK protocol messages and NACK protocol message exchanged between the user equipment devices and the base station.

26. A non-transitory computer readable medium containing program instructions embodied therein for causing a computer system to control power usage in a transceiver device, the program instructions comprising instructions to classify a plurality of user equipment devices into a plurality of categories, the plurality of user equipment receiving data from a transceiver device;

instructions to dynamically adjust a power control scheme of a power source of the transceiver device, the power control scheme comprising a plurality of power levels corresponding to the plurality of categories;

instructions to select a target load for each of the plurality of power levels;

instructions to assign power assignments to the plurality of user equipment;

instructions to calculate a remaining power buffer from a maximum power budget of the power source and the power assignments assigned to the plurality of user equipment; and instructions to schedule a plurality of data transmissions from the transceiver device in accordance with the remaining power buffer.

27. The non-transitory computer readable medium according to claim 26, wherein the instructions to dynamically adjust a power control scheme comprises:

instructions to select a power level from the plurality of power levels;

instructions to determine a traffic load corresponding to the selected power level;

instructions to compare the traffic load with a threshold traffic load; and instructions to automatically adjust the selected power level during a period of time when the traffic load exceeds the threshold traffic load and the selected power level is not a lowest power level of the plurality of power levels.

* * * * *